US007027838B2

(12) United States Patent
Zhou et al.

(10) Patent No.: US 7,027,838 B2
(45) Date of Patent: Apr. 11, 2006

(54) DUEL GROUNDED INTERNAL ANTENNA

(75) Inventors: Guangping Zhou, Lake Zurich, IL (US); Chidambaram Shankar, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/238,351

(22) Filed: Sep. 10, 2002

(65) Prior Publication Data

US 2004/0204006 A1 Oct. 14, 2004

(51) Int. Cl.
*H04B 1/38* (2006.01)
*H04M 1/00* (2006.01)

(52) U.S. Cl. ............... 455/562.1; 455/63.4; 455/568.7; 455/550.1; 343/702; 343/725; 343/795

(58) Field of Classification Search ............ 455/550.1, 455/575.7, 562.1, 556.1, 556.2, 63.4, 568.7; 343/702, 725, 700 MS, 795, 713
See application file for complete search history.

(56) References Cited

U.S. PATENT DOCUMENTS

| | | | | |
|---|---|---|---|---|
| 5,969,685 | A * | 10/1999 | Hayes et al. | 343/702 |
| 6,014,113 | A * | 1/2000 | Orchard et al. | 343/841 |
| 6,040,803 | A * | 3/2000 | Spall | 343/700 MS |
| 6,121,935 | A * | 9/2000 | Reece et al. | 343/725 |
| 6,191,743 | B1 * | 2/2001 | Jones et al. | 343/702 |
| 6,195,563 | B1 * | 2/2001 | Samuels | 455/84 |
| 6,239,765 | B1 * | 5/2001 | Johnson et al. | 343/795 |
| 6,441,790 | B1 * | 8/2002 | Forrester et al. | 343/702 |
| 6,529,746 | B1 * | 3/2003 | Kotzin | 455/562.1 |
| 6,606,059 | B1 * | 8/2003 | Barabash | 343/700 MS |
| 6,633,260 | B1 * | 10/2003 | Paschen et al. | 343/700 MS |
| 6,640,110 | B1 * | 10/2003 | Shapira et al. | 455/562.1 |
| 6,653,978 | B1 * | 11/2003 | Lahti | 343/702 |
| 6,697,020 | B1 * | 2/2004 | Ying | 343/702 |
| 6,845,253 | B1 * | 1/2005 | Schantz | 455/575.7 |

* cited by examiner

*Primary Examiner*—Marceau Milord
(74) *Attorney, Agent, or Firm*—Randall S. Vaas

(57) ABSTRACT

A dual grounded internal antenna (110) is described herein. The dual grounded internal antenna (110) may include a first ground plane (210), a second ground plane (220), and a radiating element (230). The second ground plane (220) may be operatively coupled to the first ground plane (210) via a first connection (242). The radiating element (230) may be operatively coupled to the first ground plane (210) via a second connection (244). Further, the radiating element (230) may be operatively coupled to the second ground plane (220) via a third connection (246).

32 Claims, 5 Drawing Sheets

500

DUEL GROUNDED INTERNAL ANTENNA

TECHNICAL FIELD

The present disclosure relates to wireless communication systems, and more particularly, to a dual grounded internal antenna.

BACKGROUND

A conventional wireless device such as a cellular telephone uses either a whip or helical antenna that extends from the top of the cellular telephone. The whip and helical antennas are easily broken off if the cellular telephone is mishandled, for example, by dropping it. Thus, an internal antenna such as a planar inverted F antenna (PIFA), a dual L antenna, and a micro-strip antenna may be disposed within the cellular telephone. Further, the wireless device is often used in close proximity to a human body. Typically, the cellular telephone is held in the hand and next to the ear of the user. However, this may cause potential degradation in the performance of the cellular telephone. That is, transmitted signals may be lost and the efficiency of the antenna to respond to incoming signals may be low.

Low efficiency resulting from user absorption may be mitigated by using a conducting surface such as a ground plane to separate a radiating element and a user's body. Although a single ground PIFA is typically used millimeter wave applications, it may used as an internal antenna with a cellular telephone to reduce degradation in performance in the presence of a human body. In particular, the PIFA may include a ground plane for tuning frequency and bandwidth. However, frequency and bandwidth of the PIFA may be compromised because the ground plane may only tune either the frequency or the bandwidth at a time. Even though the bandwidth may be increased, the size of the internal antenna (e.g., thickness) may also need to be increased to do so, which in turn, may increase the size of cellular telephones. Because of the inherently small size of cellular telephones, the bandwidth of the PIFA may be narrow, which in turn, results in results poor radiating performance. Therefore, a need exist for an improvement in control of the frequency and the bandwidth of an antenna without comprising the size of the antenna.

BRIEF DESCRIPTION OF THE DRAWINGS

This disclosure will describe several embodiments to illustrate its broad teachings. Reference is also made to the attached drawings.

DETAILED DESCRIPTION

Figure 1:
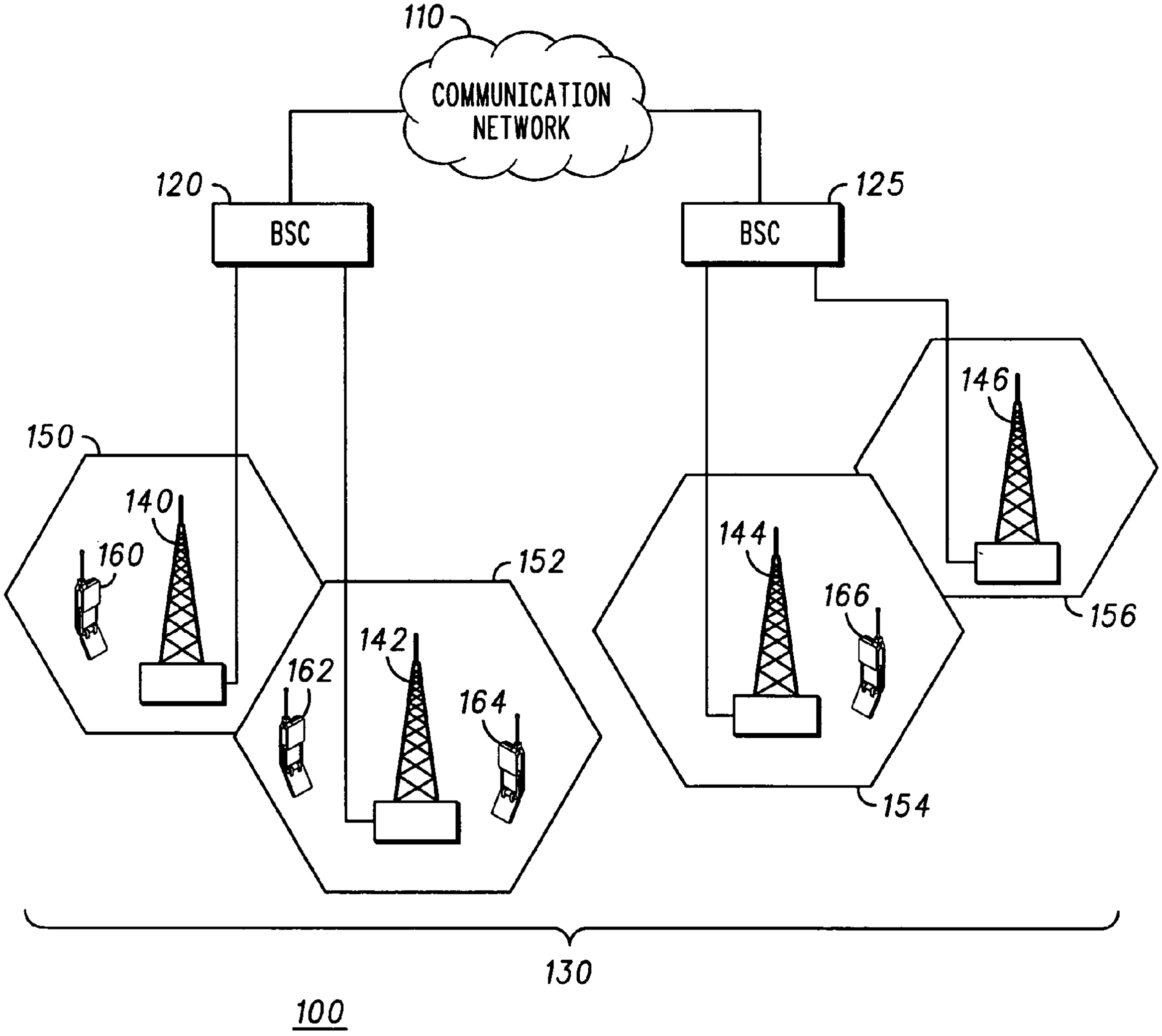
FIG. 1 is a block diagram representation of a wireless communication system.

A dual grounded internal antenna and a method for providing a dual grounded internal antenna are described herein. The dual grounded internal antenna may be integrated into a wireless device such as, but not limited to, a cellular telephone, a personal digital assistant (PDA), and a pager. In particular, the antenna may include a first ground plane, a second ground plane, and a radiating element. Each of the first and second ground planes may be a conducting material such as, but not limited to, copper. The second ground plane may be operatively coupled to the first ground plane via a first connection. The first connection may be one of a plurality of bandwidth tuning pins. The radiating element may be operatively coupled to the first ground plane via a second connection. Further, radiating element may be operatively coupled to the second ground plane via a third connection. The radiating element may be a metal material. The second connection may be a feeding pin, and the third connection may be a frequency tuning pin.

Although the embodiments disclosed herein are particularly well suited for use with cellular telephones, persons of ordinary skill in the art will readily appreciate that the teachings herein are in no way limited to cellular telephones. On the contrary, persons of ordinary skill in the art will readily appreciate that the teachings can be employed with other wireless devices that may transmit or receive a signal such as a personal digital assistant (PDA) and a pager.

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center. (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

A communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, CDMA 2000, the Personal Communications System (PCS), 3G, the Universal Mobile Telecommunications System (UMTS) and variations and evolutions of these protocols. Referring to FIG. 1, a wireless communication system 100 includes a communication network 110, and a plurality of base station controllers (BSC), generally shown as 120 and 122, servicing a total service area 130. As is known for such systems, each BSC 120 and 122 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
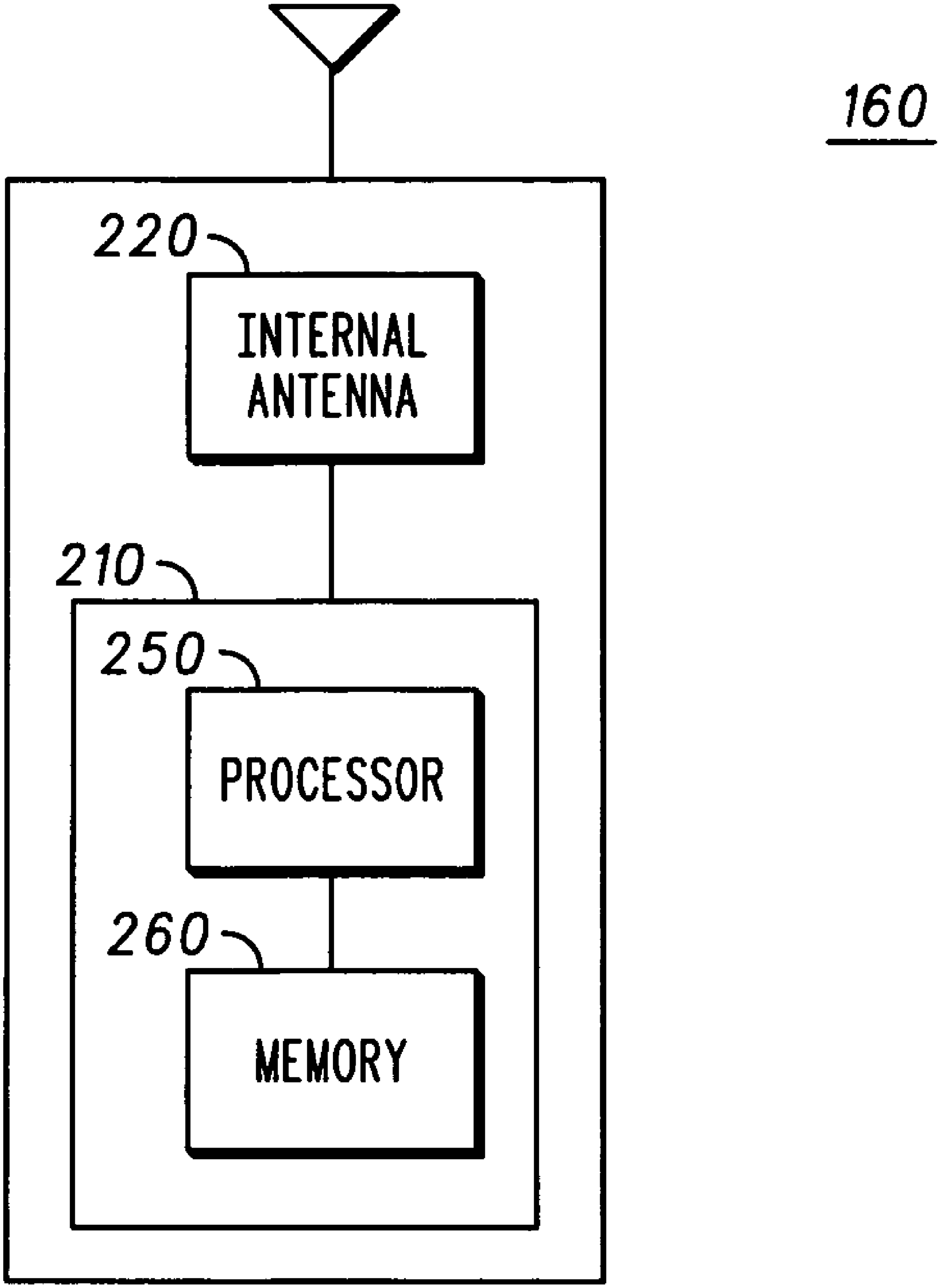
FIG. 2 is a block diagram representation of a mobile station.

Each of the mobile stations may include a dual grounded internal antenna to enhance its ability to transmit a signal and/or to receive to a signal. Referring to FIG. 2, a mobile station (one shown as 160 in FIG. 1) adapted to include a dual grounded internal antenna is shown. The mobile station 160 generally includes a controller 210, and an internal antenna 220. The controller 210 includes a processor 250 and a memory 260. The processor 250 is operatively coupled to the memory 260, which stores a program or a set of operating instructions for the processor 250. The processor 250 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The controller 210 may be operatively coupled to the internal antenna 220. The internal antenna 220 may be built on printed-circuit boards (PCB). For example, the internal antenna 220 may be integrated into the mobile station 160 by the manufacturer of the mobile station 160. Alternatively, the internal antenna 220 may be an "add-on" component integrated into the mobile station 160 by the user.

Figure 3:
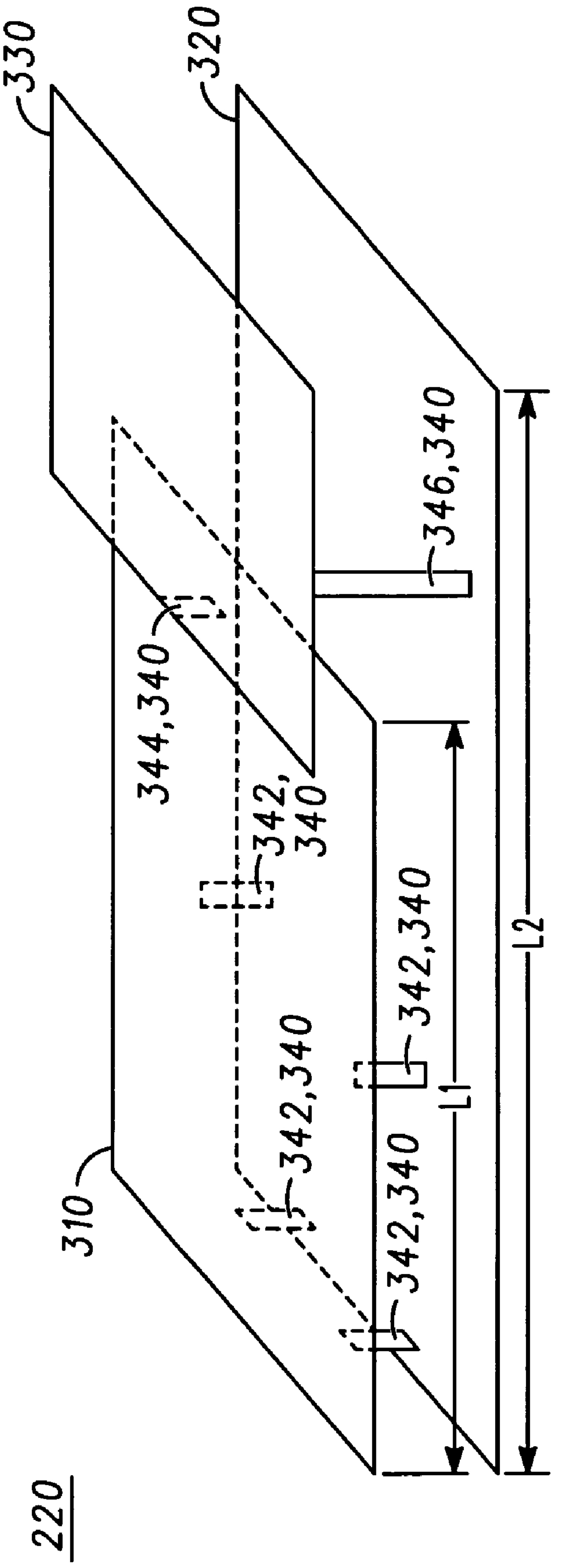
FIGS. 3 and 4 are schematic diagram representations of a dual grounded internal antenna.

The internal antenna 220 generally includes a first ground plane 310, a second ground plane 320, a radiating element 330, and a plurality of shorting pins 340 as shown in FIG. 3. The first and second ground planes 310, 320 may be electrically conductive materials such as, but not limited to, copper. The length of the first ground plane 310 (L1) may be shorter than the length of the second ground plane 320 (L2), i.e., L1<L2. The radiating element 330 may be, but is not limited to, a metal material. The plurality of connections 340 generally includes a first pins 342, a second pins 344, and a third pin 346. The first ground plane 310 may be operatively coupled to the second ground plane 320 via the first pin 342. The first pin 342 may be, but is not limited to, one of a plurality of bandwidth tuning pins. In addition, the first ground plane 310 may be operatively coupled to the radiating element 330 via the second pin 344. The second pin 344 may be, but is not limited to, a feeding pin as persons of ordinary skill in the art will readily recognize. That is, the second pin 344 may couple energy in and/or out of the radiating element 330. Further, the second ground plane 320 and the radiating element 330 may be operatively coupled together via the third pin 346. The third pin 346 may be, but is not limited to, a frequency tuning ground pin to vary resonance of the radiating element 330. The radiating element 330 may be disposed above the first and second ground planes 310, 320. The radiating element 330 may also be parallel to the first and second ground planes 310, 320.

Figure 4:
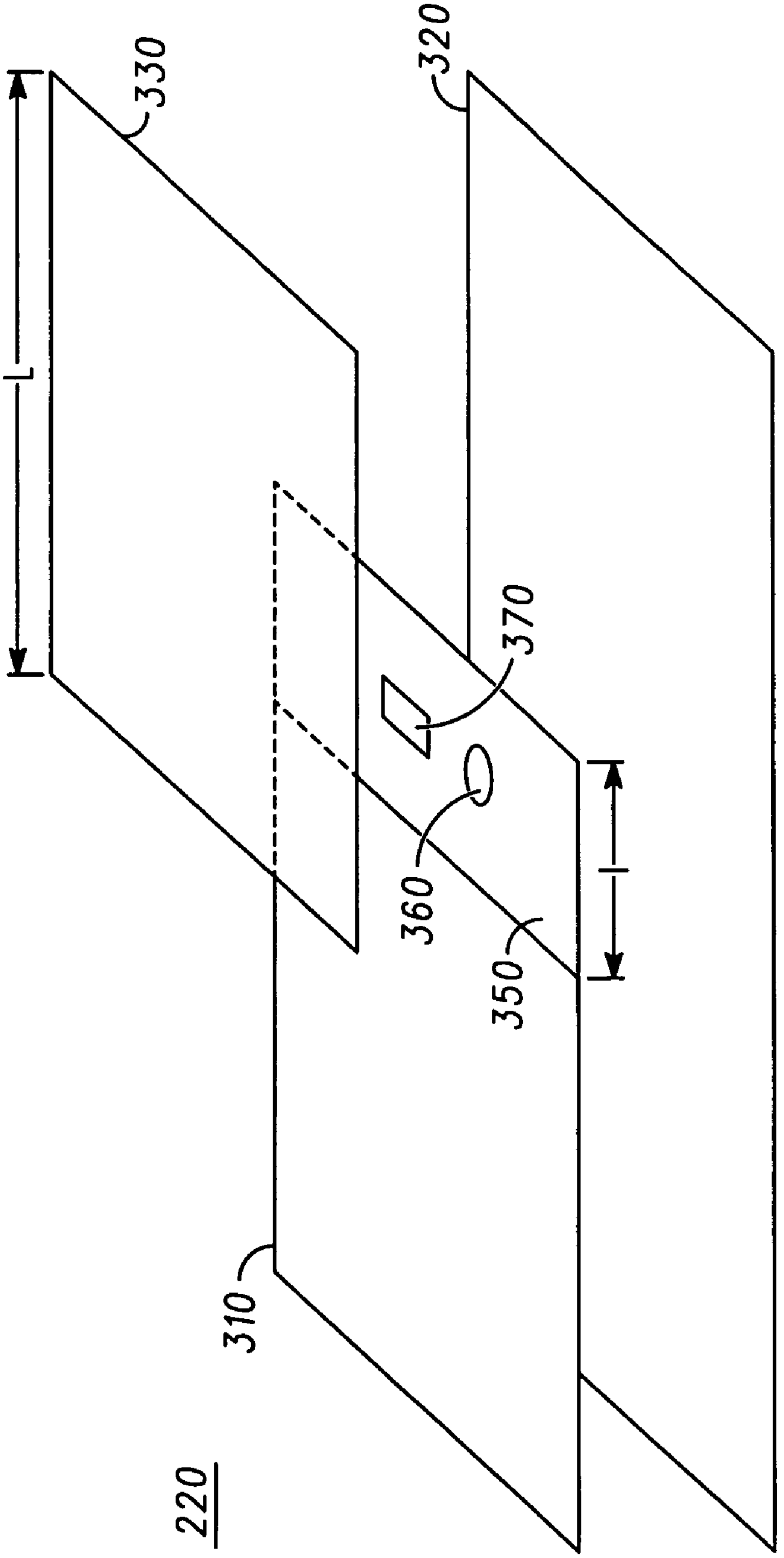

The performance of the internal antenna 220 may depend on electromagnetic couplings between the first ground plane 310, the second ground plane 320, and the radiating element 330. Proper arrangement of the first ground plane 310, the second ground plane 320, and the radiating element 330 may improve the bandwidth and gain of the internal antenna 220. Referring to FIG. 4, the first ground plane 310 may include an inserted bridge 350, i.e., a portion of the first ground plane 310 disposed intermediate of the second ground plane 320 and the radiating element 330 (i.e., "sandwiched" between the second ground plane 320 and the radiating element 330). The area of the inserted bridge 350 may determine the bandwidth of the internal antenna 220 by servicing as a form of electromagnetic coupling between the second ground plane 320 and the radiating element 330. In particular, the length of the inserted bridge 350 (l) may be greater than one-fourth of the length of the radiating element 330 (L) and less than one-half of the length of the radiating element 330 (L), i.e., $L/4<l<L/2$. Otherwise, the dual grounded internal antenna 220 may simply perform as a single grounded internal antenna. That is, if the length of the inserted bridge 350 (l) is less than one-fourth of the length of the radiating element 330 (L), i.e., L/4, then the internal antenna 220 may function as a single grounded internal antenna with only the second ground plane 320 and the radiating element 330. Similarly the length of the inserted bridge 350 (l) is greater than one-half of the length of the radiating element 330 (L), i.e., L/2, then the resonant volume between the second ground plane 320 and the radiating element 330 may be too small. That is, the first ground plane 310 may overwhelm the second ground plane 320 by reflecting a substantial amount of the electromagnetic waves from the radiating element 330. Thus, the internal antenna 220 may operate as a single grounded internal antenna with only the first ground plane 310 and the radiating element 330 when the length of the inserted bridge 350 (l) being greater than one-half of the length of the radiating element 330 (L), i.e., L/2.

Alternatively, voids such as, but not limited to, holes, slots, slits, cavities, grooves, notches, passages, and openings of a variety of size and shape may be formed in the inserted bridge 350 to provide electromagnetic couplings for proper antenna resonance. For example, a hole (one shown as 360) or a slot (one shown as 370) may be formed in the inserted bridge 350. As persons of ordinary skill in the art will readily recognize, the hole 360 and/or the slot 370 on the inserted bridge 350 may operate as inductive elements (e.g., lumped LC components) to tune frequency and bandwidth of the internal antenna 220.

Although the embodiments of the first ground plane 310, the second ground planes 320, and the radiating element 330 disclosed herein are rectangular-shaped, persons of ordinary skill in the art will readily appreciate that the teachings herein are in no way limited to that shape. On the contrary, persons of ordinary skill in the art will readily appreciate that the teachings can be employed with any other shapes such as, but not limited to, square and circle. Further, the size of the first ground plane 310, the second ground 320, and the radiating element 330 relative to each other are in no limited to what is shown in FIGS. 3 and 4 to provide wider bandwidths and higher gains for the internal antenna 220.

Typically when a person uses mobile station 160, the second ground plane 320 may placed against the person's head and the radiating element 330 may be in the direction of free space. Accordingly, most of the radiated electromagnetic waves from the radiating element 330 may be reflected by the second ground plane 320, which in turn, results in better unidirectional performance.

Figure 5:
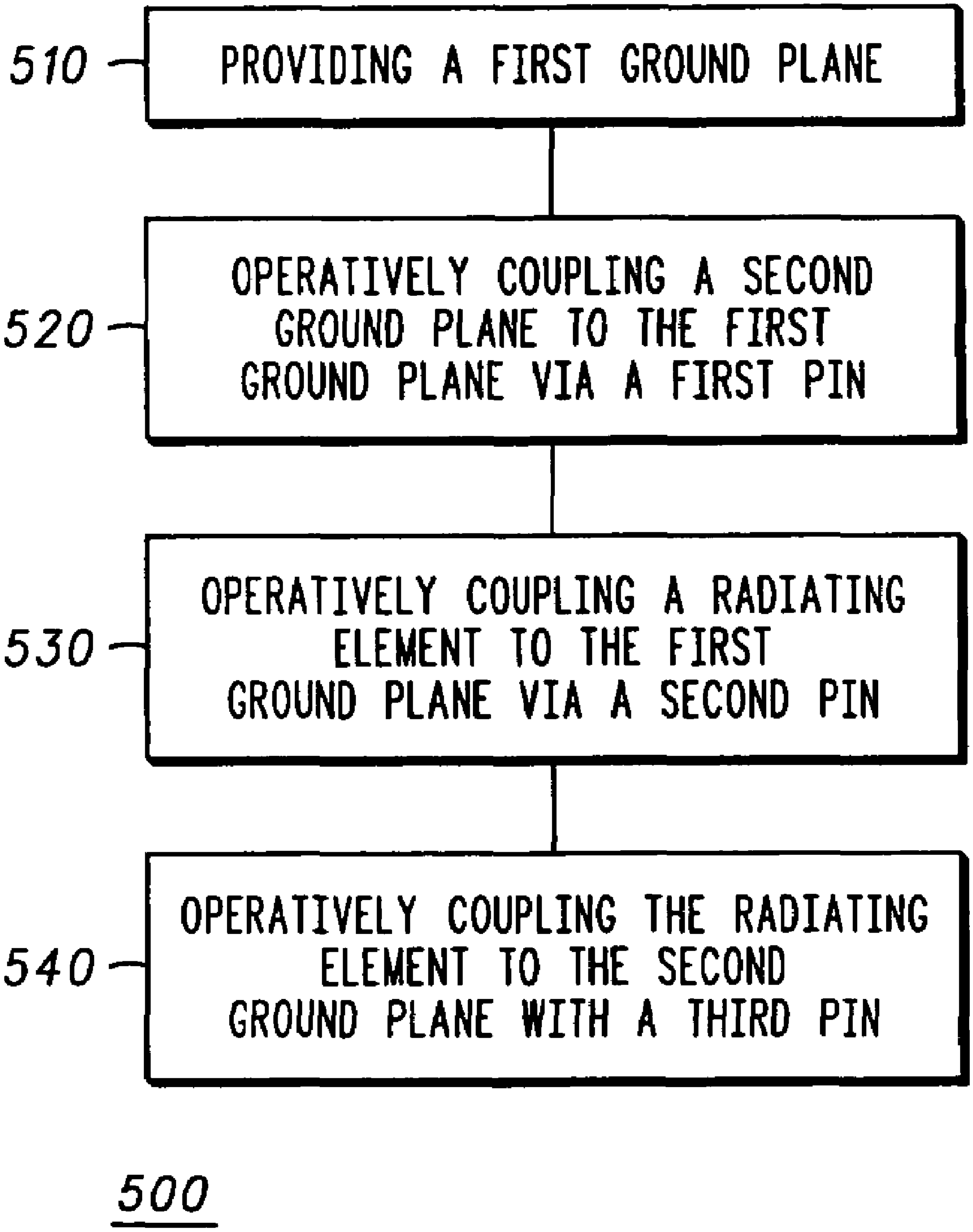
FIG. 5 is a flow diagram illustrating a method for providing a dual grounded internal antenna.

Referring to FIG. 5, a basic flow for providing the dual ground internal antenna 220 shown in FIGS. 3 and 4 may start with providing the first ground plane 310 at step 510. In particular, the first ground plane 510 may be configured to control frequency of the internal antenna 220. Thus, the internal antenna 220 may be operable in accordance with a variety of wireless communication protocols such as, but not limited to, those described above, that may operate at different frequencies. At step 520, the second ground plane 320 may be operatively coupled to the first ground plane 310 via the first pin 342. The second ground plane 320 may be configured to control bandwidth of the internal antenna 220. Typically, an internal antenna may operate within a limited bandwidth at a particular frequency. With the second ground plane 320, for example, the internal antenna 220 may be adjusted to operate within a wider bandwidth. At step 530, the radiating element 330 may be operatively coupled to the first ground plane 310 via the second pin 344. The radiating element 330 may be configured to radiate energy into the air and to receive energy from the air. Further, the radiating element 330 at step 540 may be operatively coupled to the second ground plane 220 with the third pin 246. Accordingly, the first and second ground planes 310, 320 may be used to radiate against the radiating element 330 (i.e., to balance the radiating element 330 relative to ground) to transmit or to receive a signal. That is, the first and second ground planes 310, 320 may serve as reflection points as persons of ordinary skill in art will readily recognize of the radiating element 330 to complete a path for the transmitted signal and/or the received signal. Thus, the frequency and the bandwidth of the internal antenna 220 may be independently controlled by the first and second ground planes 310, 320, respectively. By independently adjusting the frequency and the bandwidth, the size of the internal antenna 220 (e.g., height and width) may be optimized without increasing the size of the mobile station 160.

Many changes and modifications could be made to the invention without departing from the fair scope and spirit thereof. The scope of some changes is discussed above. The scope of others will become apparent from the appended claims.

What is claimed is:

1. An antenna for a handheld wireless device, the antenna comprising:

a first physical ground plane;

a second physical ground plane operatively coupled to the first physical ground plane via a first connection, the first connection being one of a plurality of bandwidth tuning pins; and a radiating element operatively coupled to the first physical ground plane via a second connection and operatively coupled to the second physical ground plane via a third connection.

2. The antenna of claim 1, wherein each of the first and second physical ground planes is a conducting material.

3. The antenna of claim 1, wherein the radiating element is a metal material.

4. The antenna of claim 1, wherein the second connection is a feeding pin.

5. The antenna of claim 1, wherein the third connection is a frequency tuning ground pin.

6. The antenna of claim 1, wherein the first physical ground plane is a ground plane having a portion disposed intermediate of the second physical ground plane and the radiating element.

7. The antenna of claim 1, wherein the first physical ground plane is a ground plane having one of a hole, a slot, a slit, a cavity, a groove, a notch, a passage, and an opening.

8. The antenna of claim 1 is integrated into one of a cellular telephone, a personal digital assistant (PDA), and a pager.

9. In a wireless communication system, wherein a mobile station includes a dual grounded internal antenna, the internal antenna comprising:

a first ground plane configured to control frequency;

a second ground plane configured to control bandwidth, the second ground plane operatively coupled to the first ground plane via a first pin; and a radiating element configured to transmit and to receive a signal, the radiating element being operatively coupled to the first ground plane via a second pin and operatively coupled to the second ground plane via a third pin.

10. The internal antenna of claim 9, wherein each of the first and second ground planes is a conducting material.

11. The internal antenna of claim 9, wherein the radiating element is a metal material.

12. The internal antenna of claim 9, wherein the first pin is one of a plurality of bandwidth tuning pins.

13. The internal antenna of claim 9, wherein the second pin is a feeding pin.

14. The internal antenna of claim 9, wherein the third pin is a frequency tuning ground pin.

15. The internal antenna of claim 9, wherein the first ground plane comprises an inserted bridge, the inserted bridge being disposed intermediate of the second ground plane and the radiating element.

16. The internal antenna of claim 9, wherein the first ground plane is ground plane having one of a hole, a slot, a slit, a cavity, a groove, a notch, a passage, and an opening.

17. The internal antenna of claim 9, wherein the mobile station is one of a cellular telephone, a personal digital assistant (PDA), and a pager.

18. A structure for transmitting and receiving a signal, wherein the structure is disposed within a mobile station, the structure comprising:

a first conducting element configured to control frequency;.

a second conducting element configured to control bandwidth, the second conducting element being operatively coupled to the first conducting element via a first connecting element; and a radiating element configured to transmit and to receive a signal, the radiating element being operatively coupled to the first conducting element via a second connecting element and operatively coupled to the second conducting element via a third connecting element.

19. The structure of claim 18, wherein the radiating element is a metal material.

20. The structure of claim 18, wherein the first connecting element is a one of a plurality of bandwidth tuning pins.

21. The structure of claim 18, wherein the second connecting element is a feeding pin.

22. The structure of claim 18, wherein the third connecting element is a frequency tuning ground pin.

23. The structure of claim 18, wherein the first conducting element is a conducting element having a portion disposed intermediate of the second conducting element and the radiating element.

24. The structure of claim 18, wherein the first conducting element is a conducting element having one of a hole, a slot, a slit, a cavity, a groove, a notch, a passage, and an opening.

25. The structure of claim 18 is integrated into one of a cellular telephone, a personal digital assistant (PDA), and a pager.

26. A method for providing a dual grounded internal antenna comprising the steps of:

providing a first ground plane;

operatively coupling a second ground plane to the first ground plane via a first pin, the first pin one of a plurality of bandwidth tuning pins;

operatively coupling a radiating element to the first ground plane via a second pin; and operatively coupling the radiating element to the second ground plane with a third pin.

27. The method of claim 26, wherein the step of providing a first ground plane comprises providing a grounded plane configured to control frequency.

28. The method of claim 26, wherein the step of operatively coupling a second ground plane to the first ground plane via a first pin comprises operatively coupling a ground plane configured to control bandwidth to a ground plane configured to control frequency via the first pin.

29. The method of claim 26, wherein the step of operatively coupling a radiating element to the first ground plane via a second pin comprises operatively coupling the radiating element to the first ground plane via a feeding pin.

30. The method of claim 26, wherein the step of operatively coupling the radiating element to the second ground plane with a third pin comprises operatively coupling the radiating element to the second ground plane with a frequency tuning ground pin.

31. The method of claim 26, wherein the step of providing a first ground plane comprises providing a ground plane having a portion disposed intermediate of the second ground plane and the radiating element.

32. The method of claim 26, wherein the step of providing a first ground plane comprises providing a ground plane having one of a hole, a slot, a slit, a cavity, a groove, a notch, a passage, and an opening.

* * * * *

UNITED STATES PATENT AND TRADEMARK OFFICE

CERTIFICATE OF CORRECTION

PATENT NO. : 7,027,838 B2
APPLICATION NO. : 10/238351
DATED : April 11, 2006
INVENTOR(S) : Zhou et al.

It is certified that error appears in the above-identified patent and that said Letters Patent is hereby corrected as shown below:

On title page Item (54) and Col 1

Please change Title to read:

DUAL GROUNDED INTERNAL ANTENNA

Signed and Sealed this

Fifteenth Day of August, 2006

JON W. DUDAS
*Director of the United States Patent and Trademark Office*